(12) United States Patent
Takada

(10) Patent No.: US 7,831,130 B2
(45) Date of Patent: Nov. 9, 2010

(54) CIRCULATING RECORDING APPARATUS, RECORDING METHOD AND RECORDING MEDIUM STORING PROGRAM OF THE RECORDING METHOD

(75) Inventor: Tomomi Takada, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 1111 days.

(21) Appl. No.: 11/503,131

(22) Filed: Aug. 14, 2006

(65) Prior Publication Data

US 2007/0041719 A1 Feb. 22, 2007

(30) Foreign Application Priority Data

Aug. 16, 2005 (JP) ............... 2005-235627

(51) Int. Cl.
  *H04N 5/76* (2006.01)
  *H04N 5/00* (2006.01)
(52) U.S. Cl. ........................ 386/83; 386/125
(58) Field of Classification Search ............. 386/1, 386/45–46, 83, 95–96, 125–126
  See application file for complete search history.

(56) References Cited

U.S. PATENT DOCUMENTS

| | | | |
|---|---|---|---|
| 6,378,031 B1 | 4/2002 | Kuno et al. | |
| 7,409,141 B2 * | 8/2008 | Yamasaki | ............ 386/68 |
| 7,440,678 B2 * | 10/2008 | Haino et al. | ............ 386/95 |
| 2004/0244055 A1 | 12/2004 | Takada et al. | |
| 2005/0076176 A1 | 4/2005 | Takada et al. | |

FOREIGN PATENT DOCUMENTS

| | | |
|---|---|---|
| JP | 200020365 | 1/2000 |
| JP | 2004220355 | 8/2004 |
| KR | 100231710 | 11/1999 |

OTHER PUBLICATIONS

Korean Patent Application Publication No. 1998-050177 corresponds to KR 10-0231710.

* cited by examiner

*Primary Examiner*—Thai Tran
*Assistant Examiner*—Nigar Chowdhury
(74) *Attorney, Agent, or Firm*—Brundidge & Stanger, P.C.

(57) ABSTRACT

A recording apparatus employs a circulating recording scheme for overwriting the oldest recorded data in a recording area having a limited storage capacity with the latest recorded data. The recording apparatus includes a memory device and a data recovery unit. The memory device includes a data recording area for recording data, an index information area for recording index information related to the data recorded in the data recording area, and a reserve index information area provided in part of the data recording area for recording substantially the same index information as the index information. When an error is found in index information recorded in the index information area, the data recovery unit recovers the index information in the index information area based on the index information in the reserve index information area.

7 Claims, 12 Drawing Sheets

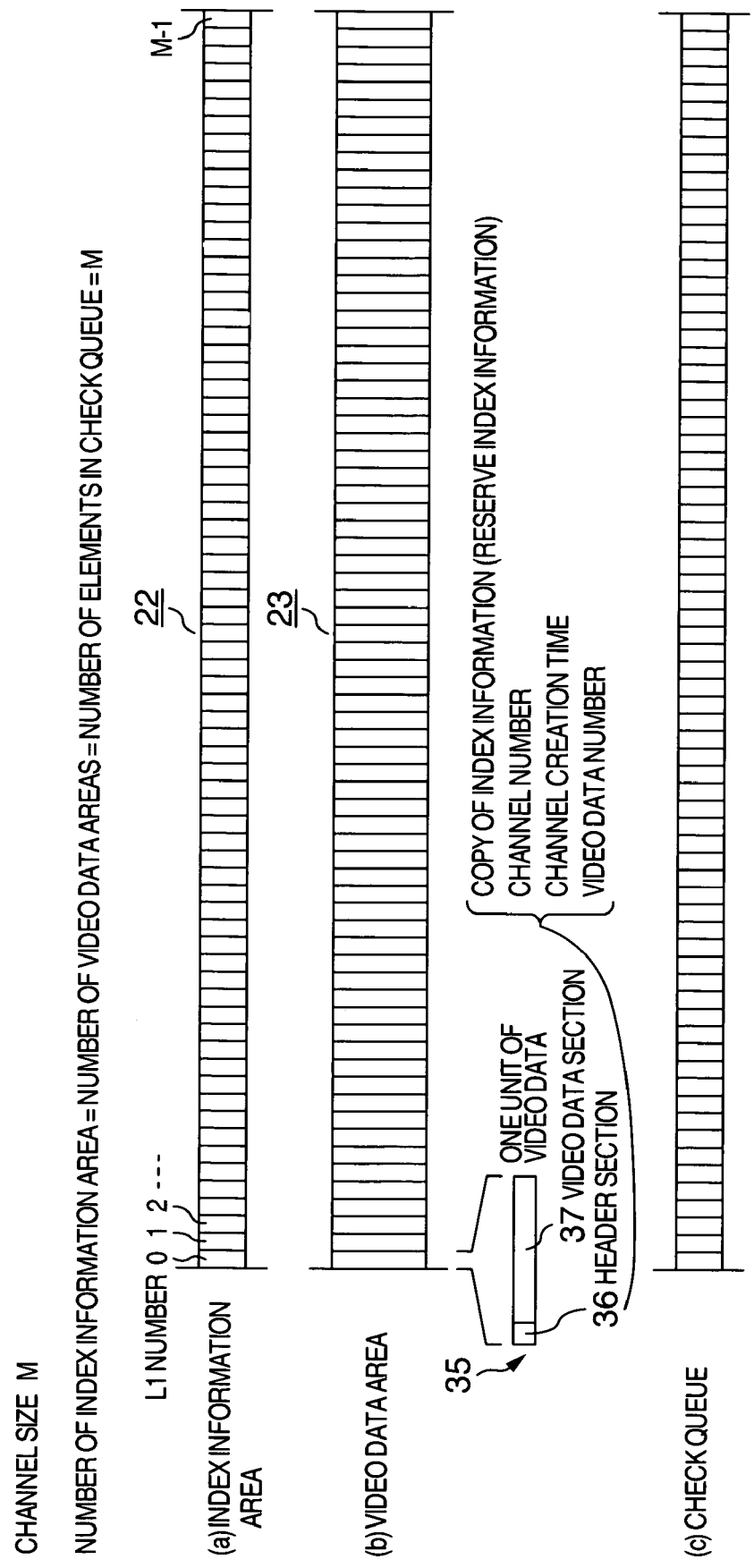

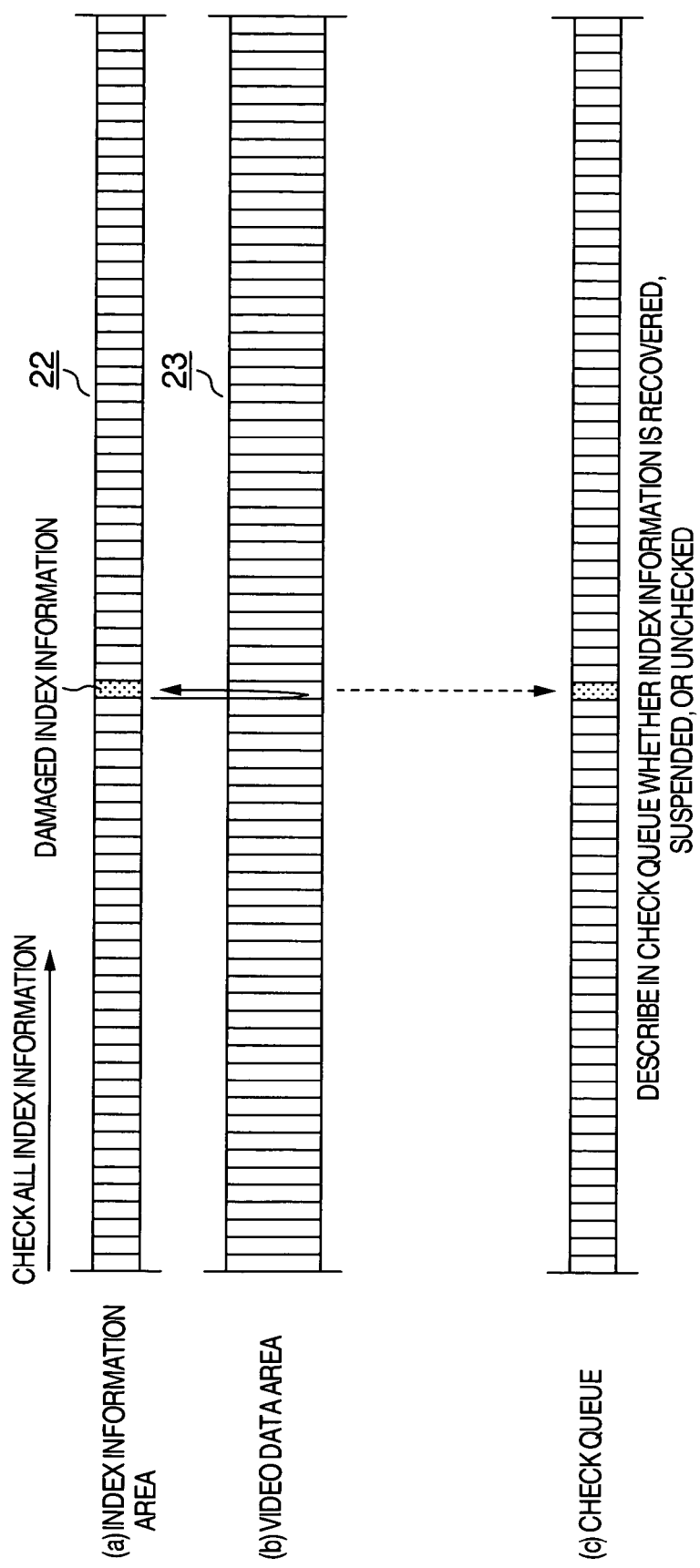

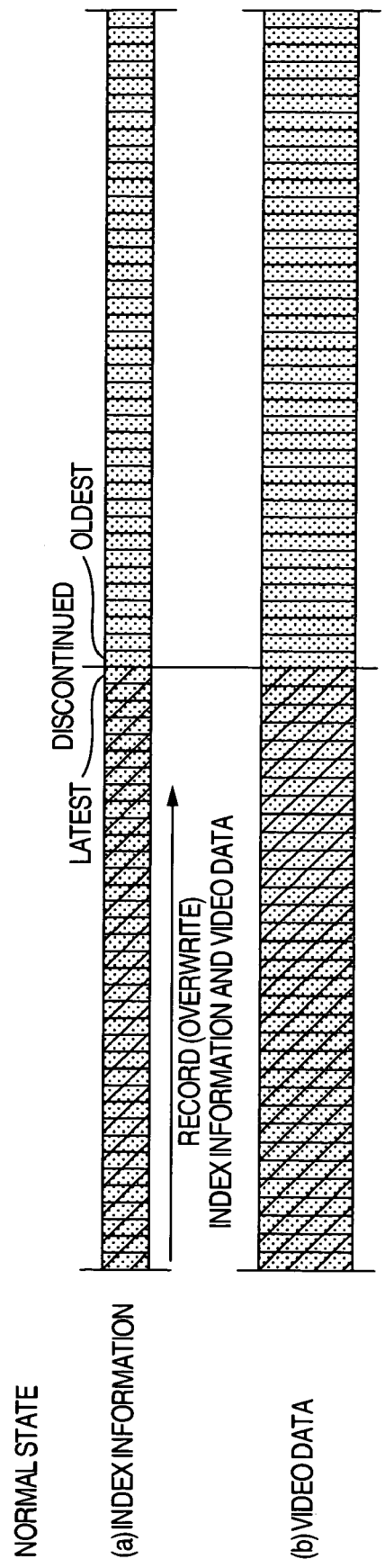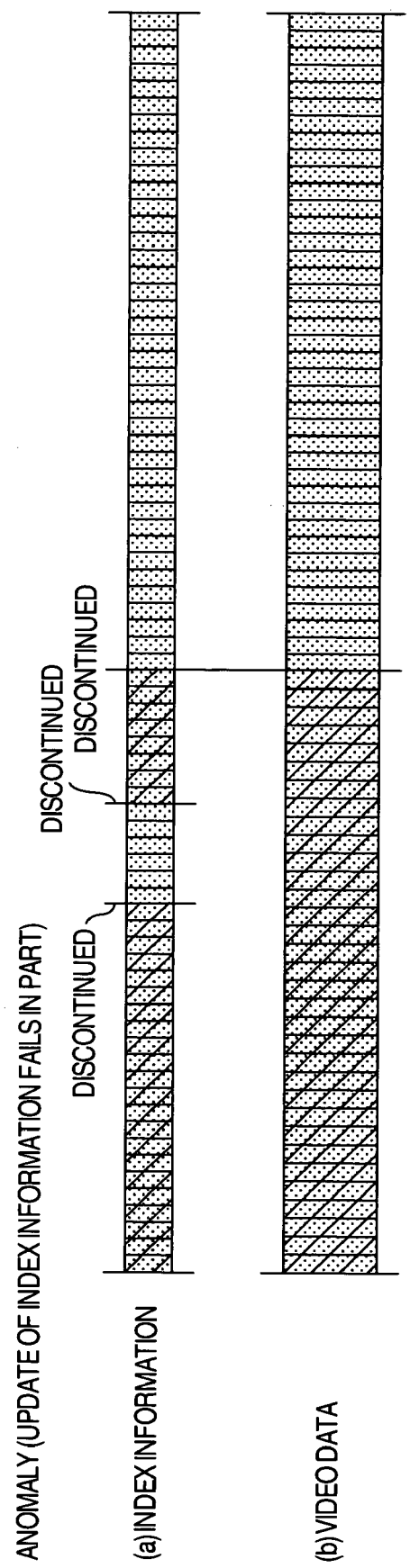

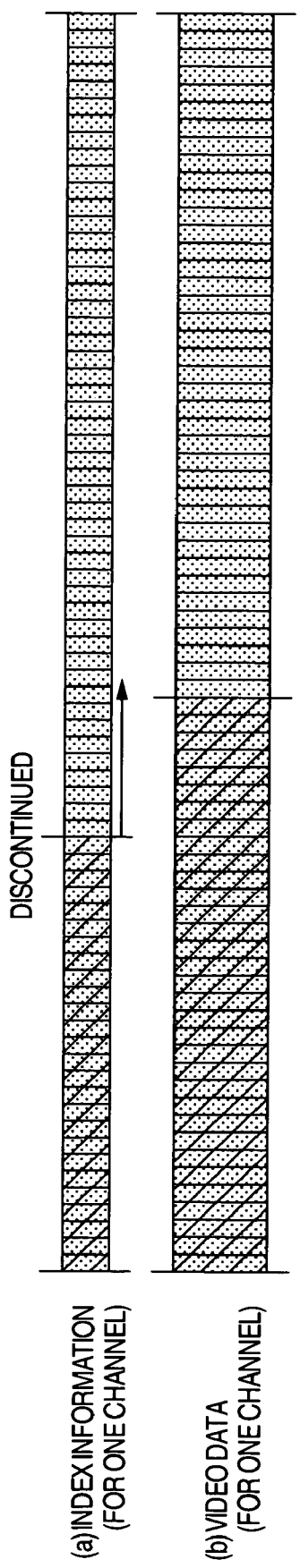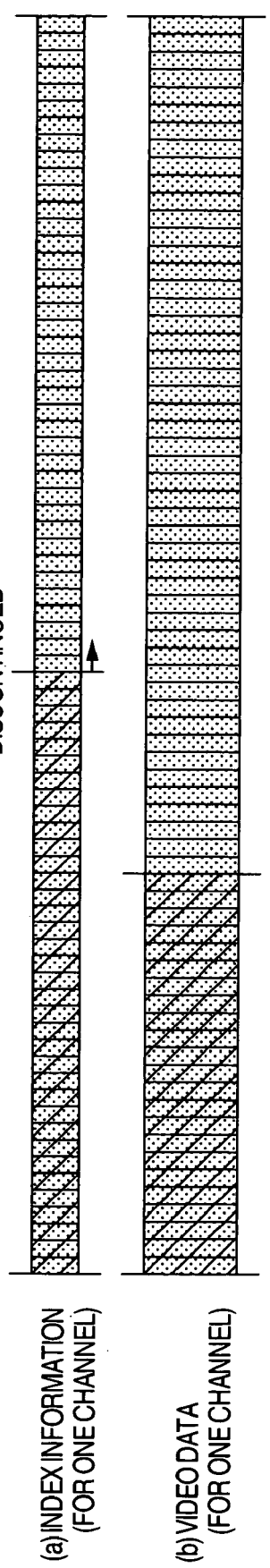

CIRCULATING RECORDING APPARATUS, RECORDING METHOD AND RECORDING MEDIUM STORING PROGRAM OF THE RECORDING METHOD

INCORPORATION BY REFERENCE

The present application claims priority from Japanese application JP2005-235627 filed on Aug. 16, 2005, the content of which is hereby incorporated by reference into this application.

CROSS-REFERENCE TO RELATED APPLICATION

The present invention relates to the co-pending U.S. application Ser. No. 10/942,887 (US Patent Application Publication No. US 2005/0076176A1) filed on Sep. 17, 2004, entitled "Circulating Recording Apparatus, Method and Program" and Ser. No. 10/852,120 (US Patent Application Publication No. US2004/0244055A1) filed on May 25, 2004, entitled "Circulating Memory Apparatus and Image Storage Distribution system". The entire content of the co-pending applications is incorporated herein by reference.

BACKGROUND OF THE INVENTION

The present invention relates to a recording apparatus which employs, for example, a circulating recording scheme, and more particularly, to a recording apparatus, a recording method, and a recording medium storing a program therefor for effectively recovering recorded contents from errors which have occurred therein.

Time-series video and audio data have been recorded by a recording apparatus. Since such a recording apparatus has a limited memory capacity, a circulating recording scheme is employed. The circulating recording scheme, which circularly utilizes a limited memory area reserved in a recording apparatus, sequentially overwrites the oldest data in time series with the most recent data, thereby making it possible to preserve a predetermined amount of past data for reproduction.

In an example of a remote monitoring system which utilizes a video storage/delivery system, time-series video data sequentially captured by an image pickup apparatus such as a web camera is recorded (stored) on a large-capacity recording medium such as a magnetic disk (for example, a hard disk drive), an optical disk, a semiconductor memory or the like, and the recorded video data is delivered as required to a user through a network, thereby allowing the user to monitor the image on a monitor screen installed at a remote location. In addition, a plurality of image pickup apparatuses may be installed to monitor images at a plurality of locations (images on a plurality of channels).

When time-series video and audio data are recorded by a recording apparatus, image frames are compressed, for example, in accordance with an image compression scheme such as JPEG before the data is recorded. However, when the image frames are compressed, the data size can differ from one frame to another depending on image conditions.

For this reason, in a circulating recording apparatus which circularly uses a memory area reserved in the recording apparatus, given as an example of the prior art, investigations are now under way to edit time-series input data into data blocks of a predetermined size, each comprised of a plurality of sub-blocks, and write the data in data blocks, and to read data from the recording apparatus to a cache memory in sub-blocks in response to a request for outputting particular data to selectively output the particular data included in some sub-block (see, for example, US Patent Application Publication No. US2005/0076176A1). This strategy is intended to improve the efficiency of accessing the circulating recording area to effectively utilize the circulating recording area.

SUMMARY OF THE INVENTION

However, in the recording apparatus as described above, if a system unintentionally shuts down, for example, when an storage/delivery server device is in operation or when a channel capacity is changed, a file system suffers from errors in some cases, though at a low probability. At present, no function has been sufficiently developed for recovering a file system from errors, if any, so that countermeasures taken therefor simply involve, for example, deleting video and audio data and re-formatting the file system.

The present invention has been made in order to solve such problems of the prior art, and it is an object of the invention to provide a recording apparatus based, for example, on a circulating recording scheme, which is capable of effectively recovering recorded contents from an error which has occurred therein.

To achieve the above object, a recording apparatus according to the present invention employs a circulating recording scheme for overwriting the oldest recorded data in a recording area having a limited storage capacity with the latest recorded data. The recording apparatus includes a memory device including a data recording area for recording data, an index information area for recording index information related to the data recorded in the data recording area, and a reserve index information area provided in part of the data recording area for recording substantially the same index information as the index information, and a data recovery unit operative when an error is found in index information recorded in the index information area for recovering the index information in the index information area based on the index information in the reserve index information area.

According to the present invention, the data recording area is comprised of a plurality of data unit areas, where recorded data is divided and recorded in the data unit areas. The index information area in turn is comprised of a plurality of index unit areas, where the index information is divided and recorded in the index unit areas. Specifically, data is recorded in the data recording area on a unit-by-unit basis. The index information is recorded in the index information recording area in a unit-by-unit basis.

Then, when an error is found, the recovery unit recovers the index information in the index unit area recorded in the index information recording area based on the reserve index information recorded for data in a data unit area recorded in the data recording area.

The reserve index information substantially the same as the index information corresponding to data in a data unit area is recorded (copied), other than the data, in part of the data unit area in an external data recording area of every unit data. Therefore, for example, even if the index information is damaged in the index information recording area, the index information can be recovered based on the reserve index information, so that recorded contents can be effectively recovered from an error which has occurred therein.

Here, the data recorded in the data recording area may include a variety of data, for example, video (image) data, audio data and the like.

The index information in the index unit area may include information which identifies the internal structure of data in a data unit area corresponding to the index unit area, information on the state, time and the like of data, and so forth. For example, the index information may be the number of frames of data, a recording time, a data size, a data state, and the like.

The data recording area and index information recording area can be implemented, for example, by memories.

Also, the data recording area and index information recording area may be implemented, for example, by different memories, or in the same memory, the recording area of which is divided into the data recording area and index information recording area.

The data recording area and index information recording area record a plurality of units of data and index information, respectively, on a unit-by-unit basis.

Only one set of the data and index information, for example, may be provided, or alternatively, a plurality of sets may be provided in correspondence to a plurality of channels.

The reserve index information may be the same information as corresponding index information, i.e., a copy. Even if the index information is apparently different in form from the reserve index information, for example, when different encoding or encryption schemes are employed between the index information in the index information area and data in the data recording area, such information can be used as well provided that the information has substantially the same contents.

The reserve index information may be included in part of the data unit area of the data recording area, for example, by embedding the reserve index information in data in the data unit area, or by adding the reserve index information to data in the data unit area. In any case, the reserve index information and essential recorded data are included in the data unit area.

When an error is found in the index information, the index information in the corresponding index information area may be recovered based on the reserve index information in a variety of manners. For example, when the index information in an index unit area is damaged, the damaged index information can be recovered to correct index information. Also, when the index information in an index unit area is likely to be damaged, the index information can be recovered. In other words, though it is not correctly known whether the index information is damaged or not, the likely damaged index information can be replaced with correct index information for security. Also, for example, when an attempt is made to recover the index information in an index unit area, the state of data may be determined in a corresponding data unit area. When the data is normal, the index information is recovered, whereas when the data is not normal, the index information is not recovered. Further, a determination may be made on the state of reserve index information included in data of a data unit area corresponding to an index unit area of interest, and the index information is recovered when the reserve index information is normal, and is not recovered when it is not normal.

In one exemplary configuration, the recording apparatus according to the present invention is configured in the following manner.

Specifically, the data recording area records data which is divided into a plurality of data unit areas. The index information recording area includes a plurality of index unit areas corresponding to the data in the plurality of data unit areas, such that index information is recorded in each of the index unit areas.

Then, the recovery unit determines whether or not the index information is damaged in each of the plurality of index unit areas defined in the index information recording area, and recovers the index information in a unit area which is determined to be damaged.

In this way, since the index information is recovered only in a unit area, which is damaged, of the plurality of index unit areas, a time required for the recovery can be reduced to improve the efficiency, for example, as compared with a strategy which recovers entire index information.

Here, a variety of approaches may be used for determining whether or not index information is damaged in each of the index unit areas.

In one exemplary configuration, a plurality of units of data, and a plurality of units of index information corresponding thereto are recorded in order, on a unit-by-unit basis, together with a number and the like given thereto, such that it is determined whether or not the index information is damaged on a unit-by-unit basis.

In another exemplary configuration, index information may be selected from recorded index information in the plurality of index unit areas, followed by a determination as to whether or not the selected index information is damaged.

In one embodiment, the recording apparatus according to the present invention is configured in the following manner.

Specifically, the data recording area records data in the plurality of data unit areas. The index information recording area records index information in a plurality of index unit areas corresponding to the data in the plurality of data unit areas.

Also, data in each unit area includes one or two or more frames. Each of the frames included in the data in each unit area is given a serial number in order for the data in the plurality of data unit areas.

The index information in each index unit area includes frame information for identifying a number of the first frame included in data in a data unit area corresponding to the index information in the index unit area, and the number of frames included in the data unit area, as well as a state flag for identifying whether the data in the data unit area is in a normal state or an unused state or a damaged state.

Also, the separately provided check queue area records whether data in each of the plurality of data unit areas recorded in the data recording area is in a recovered state or a suspended state or an unchecked state.

Then, the recovery unit performs the following processing on data in each of the plurality of data unit areas defined in the data recording area in an ascending order or descending order, if the data in the data unit area of interest satisfies any of the following conditions: (1) when the data in the unit area of interest differs in state from data in the preceding unit data based on the state flag, or (2) when the data in the preceding unit area is in a recovered state or suspended state based on the recorded contents of the check queue area, or (3) when the data in the unit area of interest and the data in the preceding unit area are both in a normal state based on the state flag, and when the frame numbers are discontinuous between the data in the preceding unit area and the data in the unit area of interest based on the frame information. Specifically, when data in a data unit area to be checked is determined to be normal, and when the reserve index information included in the data in the data unit area of interest is not damaged (normal), the recovery unit recovers the index information in the index unit area corresponding to the data in the data unit area to be checked, and records in the check queue area that the data in the data unit area to be checked is in a recovered state. Otherwise, the recovery unit records that the data in the data unit area to be checked is in a suspended state in the check queue area.

Accordingly, data in a data unit area to be checked is recovered for sets of data in a plurality of data unit area and index information in a plurality of index unit areas, in an ascending order or descending order, only (1) when the data in the data unit area has a different value of the state flag from data in the preceding unit area, or (2) when the value in the check queue area for the data in the preceding unit area indicates a recovered state or suspended state, or (3) when the data in the data unit area to be checked and the data in the preceding unit area are both in a normal state, but when the frame numbers, based on the frame information, are discontinuous between them. In this way, a time required for the recovery can be reduced to improve the efficiency, for example, as compared with a strategy which recovers entire index information.

Here, for example, serial numbers are given to the data in the plurality of data unit areas. Specifically, the numbers are given in the order of a frame included in data in the first unit area, a frame included in data in the second unit area, a frame included in data in the third unit area, . . . . When two or more frames are included in data in one unit area, the number is given to each of the frames in order. In this way, serial numbers are given to respective frames of data in the plurality of data unit areas in order.

Also, information on the number of the first frame included in data in each data unit area, and information on a total number of frames are included in the index information in each index unit area corresponding thereto as the frame information. Thus, the continuity is maintained for the frame numbers identified by the frame information when the index information is correct.

A variety of information may be used for the state flag. Generally, the normal state, unused state, or damaged state indicated by the value of the state flag represents a state in which data is normal, a state in which data is not used (i.e., not in a used state), a state in which data is damaged, respectively, but a variety of definitions may be made in a more specific manner.

The check queue area can be implemented, for example, by a memory. Generally, the recovered state, suspended state, or unchecked state indicated by the value of the check queue area represents a recovered state, a recovery suspended state, or an unchecked state (i.e., a not checked state), respectively, but variety of definitions may be made in a more specific manner.

The check queue array may be provided, for example, in a component such as a disk device which comprises the data recording area and index information recording area, or in a component different from such a component, for example, a device which has a controller. In other words, each means may be integrated in a single device, or distributed in a plurality of devices.

A variety of approaches may be used for determining whether or not data in a data unit area is normal. When index information is correct in an index unit area corresponding to data in a data unit area, it is possible to determine based on the state flag included in the index information in the index unit area whether or not the data is normal, but if the index information in the index unit area is likely to be damaged, for example, a determination can be made as to whether or not the data is normal based on previously set criteria.

Also, a variety of approaches may be used to determine whether or not reserve index information included in data in a data unit area is not damaged (is normal). For example, the determination can be made based on previously set criteria.

In a preferred implementation of the recovery unit, data in a plurality of data unit areas are checked both in an ascending order and a descending order, but in another exemplary configuration, the check may be made only in the ascending order or descending order.

The present invention can also provide a recording method for a circulating recording apparatus in the form of a program for a recording process, a recording medium and the like.

In the recording method according to the present invention, each means executes a variety of processes in the recording apparatus.

A program according to the present invention is executed by a computer which comprises the recording apparatus, wherein a variety of functions are accomplished by the computer.

A recording medium according to the present invention has recorded thereon a program executed by a computer which comprises the recording apparatus, such that the program can be read by input means of the computer, where the program causes the computer to execute a variety of processes.

As described above, according to the recording apparatus of the present invention, in recording data in a data unit area and index information in an index unit area associated with the data, reserve index information, which is the same information as the index information in the index unit area, is recorded in the data unit area together with the data, such that the index information in the index unit area is recovered based on the reserve index information included in the data in the data unit area. Even if the index information is damaged in the index unit area, the index information can be recovered based on the reserve index information in the data unit area corresponding thereto, thus effectively recovering recorded contents from an error which has occurred therein.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing (a) an example of an index information area, (b) a diagram showing an example of a video data area, and (c) a diagram showing an example of a check queue area, respectively;

FIG. 10 includes diagrams for describing a recovery process 1, where (a) is a diagram showing an example of an index information area, (b) is a diagram showing an example of a video data area, and (c) is a diagram showing an example of a check queue area;

FIG. 11A shows (a) exemplary index information and (b) exemplary video data in a normal state;

FIG. 11B shows (a) an example of index information and (b) an example of video data in an anomalous state;

FIG. 12A shows (a) an example of index information and (b) an example of video data when the video data can be recovered through a search in an ascending direction;

FIG. 12B shows (a) an example of index information and (b) an example of video data when the video data cannot be recovered through a search in the ascending direction;

DESCRIPTION OF THE EMBODIMENTS

An embodiment according to the present invention will be described with reference to the accompanying drawings.

Figure 1:
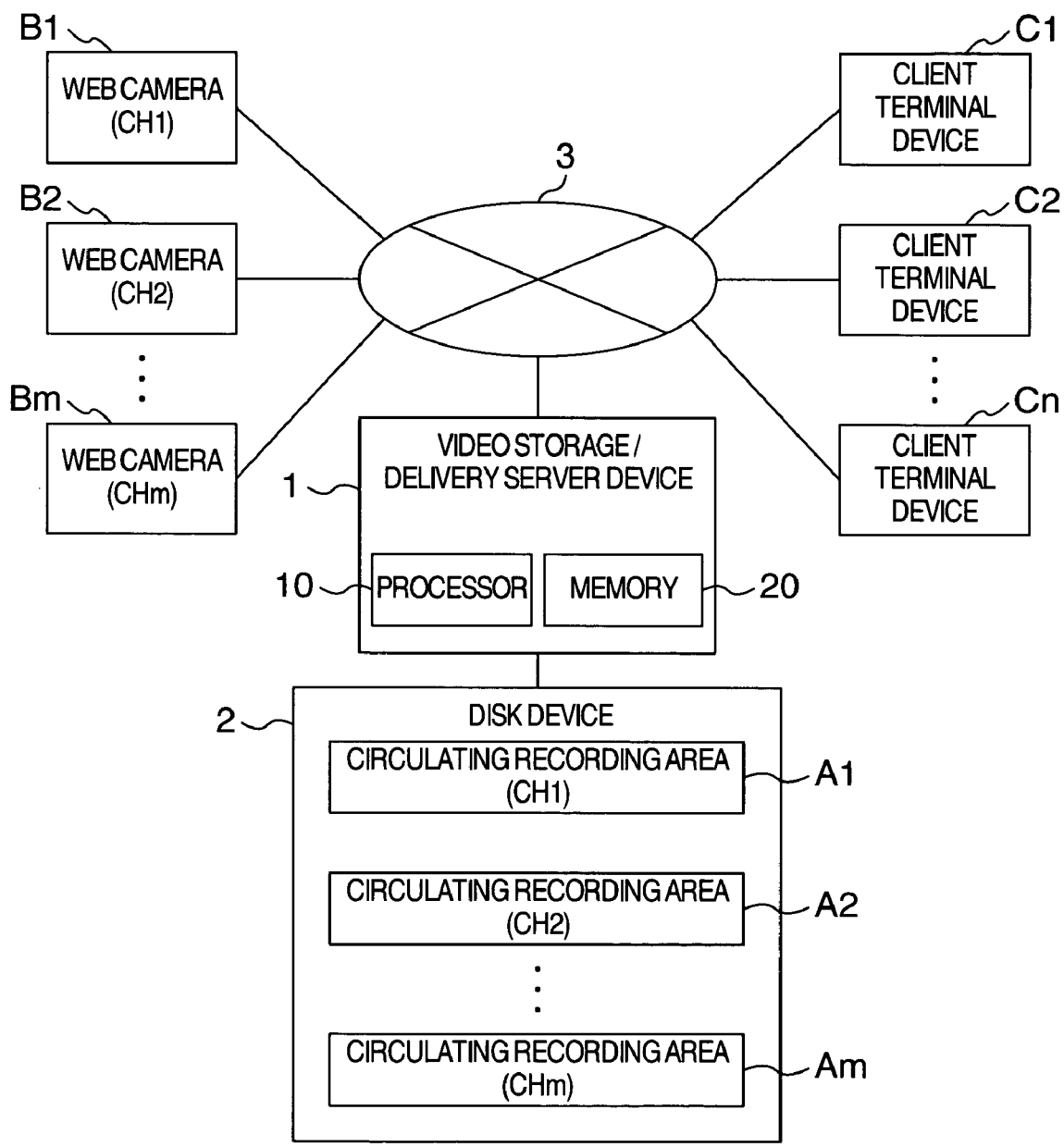
FIG. 1 is a block diagram illustrating an exemplary configuration of a video accumulation/delivery system according to one embodiment of the present invention.

FIG. 1 illustrates an exemplary configuration of a video storage/delivery system according to one embodiment of the present invention.

The video storage/delivery system of this embodiment comprises a video storage/delivery server device 1 having a disk device 2; m web cameras B1-Bm; n client terminal devices C1-Cn; and a network 3 for interconnecting these components such that communications can be made thereacross. Here, m and n are integers equal to or larger than two. The server device 1 includes a processor 10 for executing a data recording process and a recovery process according to the present invention in accordance with programs stored in a memory 20.

The web cameras B1-Bm correspond to different channels (CH1-CHm), respectively, and disk device 2 comprises m circulating recording areas A1-Am corresponding to the respective channels (CH1-CHm).

Each of the client terminal devices C1-Cn is based, for example, on a personal computer (PC) and the like.

In the video storage/delivery system of this embodiment, video data imaged by and audio data captured by each of the web cameras B1-Bm (in this embodiment, collectively called the "video data") are transmitted to the video storage/delivery server device 1 through the network 3, and recorded (stored) in the circulating recording areas A1-Am associated with channels which correspond to the web cameras B1-Bm, respectively. Also, for example, in response to requests from the client terminal devices C1-Cn, the video storage/delivery server device 1 transmits (delivers) video data recorded in the circulating recording areas A1-Am associated with requested channels to the client terminal devices C1-Cn through the network 3. The client terminal device C1-Cn reproduces received video data to output an image on a screen and output a sound from a speaker.

In the following, a description will be given of a function of recovering a video file system which comprises the circulating recording areas A1-Am formed in the disk device 2 provided for the video storage/delivery server device 1.

Figure 2:
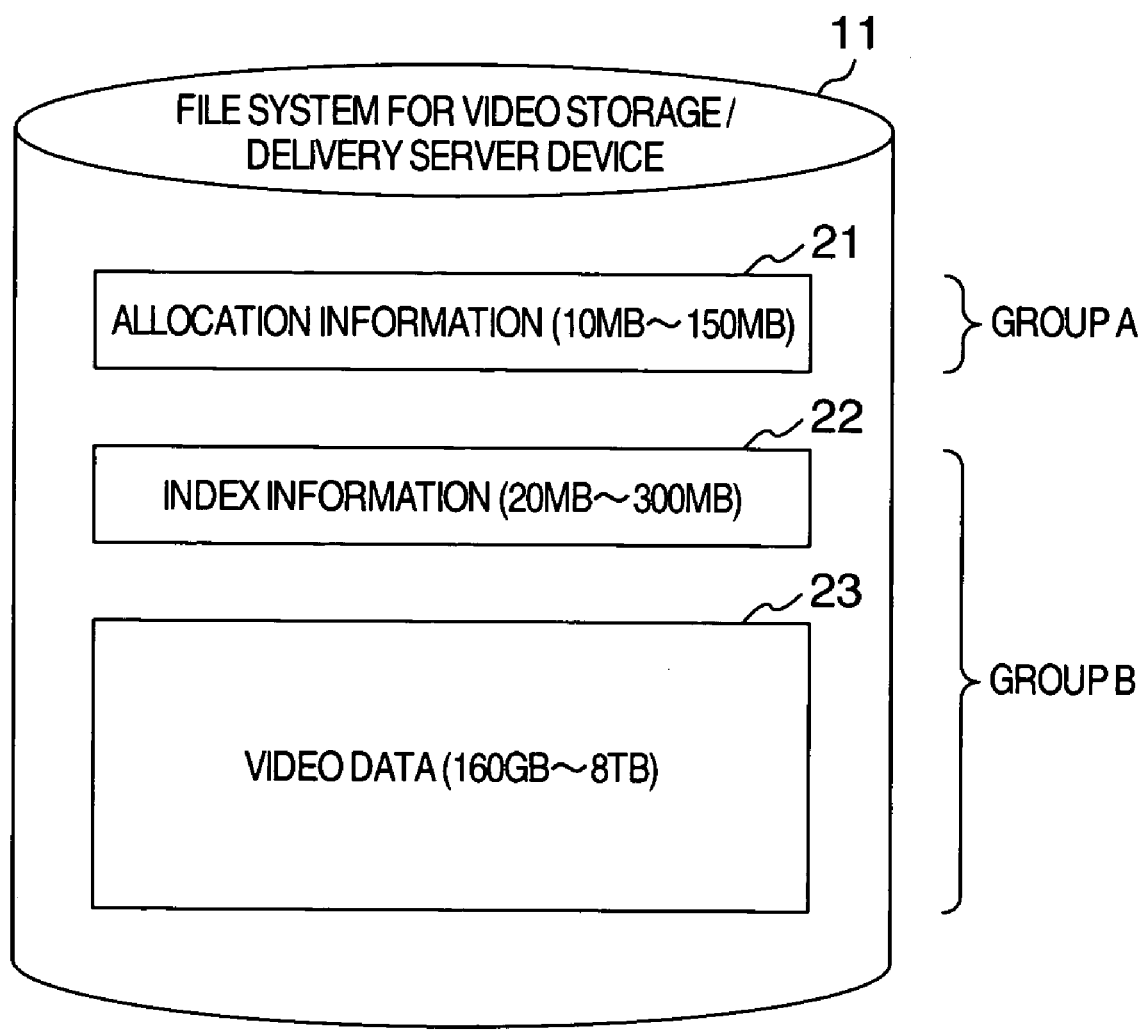
FIG. 2 is a block diagram illustrating an exemplary configuration of a file system.

FIG. 2 illustrates an exemplary configuration of a file system (file system for the video storage/delivery server device) 11.

The file system 11 of this embodiment comprises an area having 10 MB-150 MB for recording allocation information 21; an area having 20 MB-300 MB for recording index information 22; and an area having 160 GB-8 TB (terabyte) for recording video data.

Information recorded in the file system 11 can be roughly classified into Group A and Group B according to the frequency at which information is re-written.

Information in Group A is information which is re-written when an area is changed. A change in area may result from a change in the number of physical disks, an addition or a deletion of a video recording channel, a change in area size, and the like.

Specific examples of information in Group A include information of a special marker indicating that the disk is used for the file system 11 for the video accumulation/delivery server device, and the allocation information 21 indicative of an area on a disk in which a channel is allocated.

Information in Group A is characterized by a low frequency of changes, a relatively small amount of data, and the ability to be backed up in a practical time.

Information in Group B is information which is re-written any time in association with accumulation of video data 23.

Specific examples of information in Group B include index information 22 indicative of a recorded position and a recorded time of video data 23 in a channel, and the video data 23 itself. The index information 22 is created for every unit of video data 23. One unit of video data 23 may comprise a plurality of frames (alternatively, GOV or the like may be used) populated in an area of 1 Mbyte, by way of example.

Information in Group B is characterized by a high frequency of changes and a large amount of data, so that an entire backup, for example, is not practical.

Figure 3:
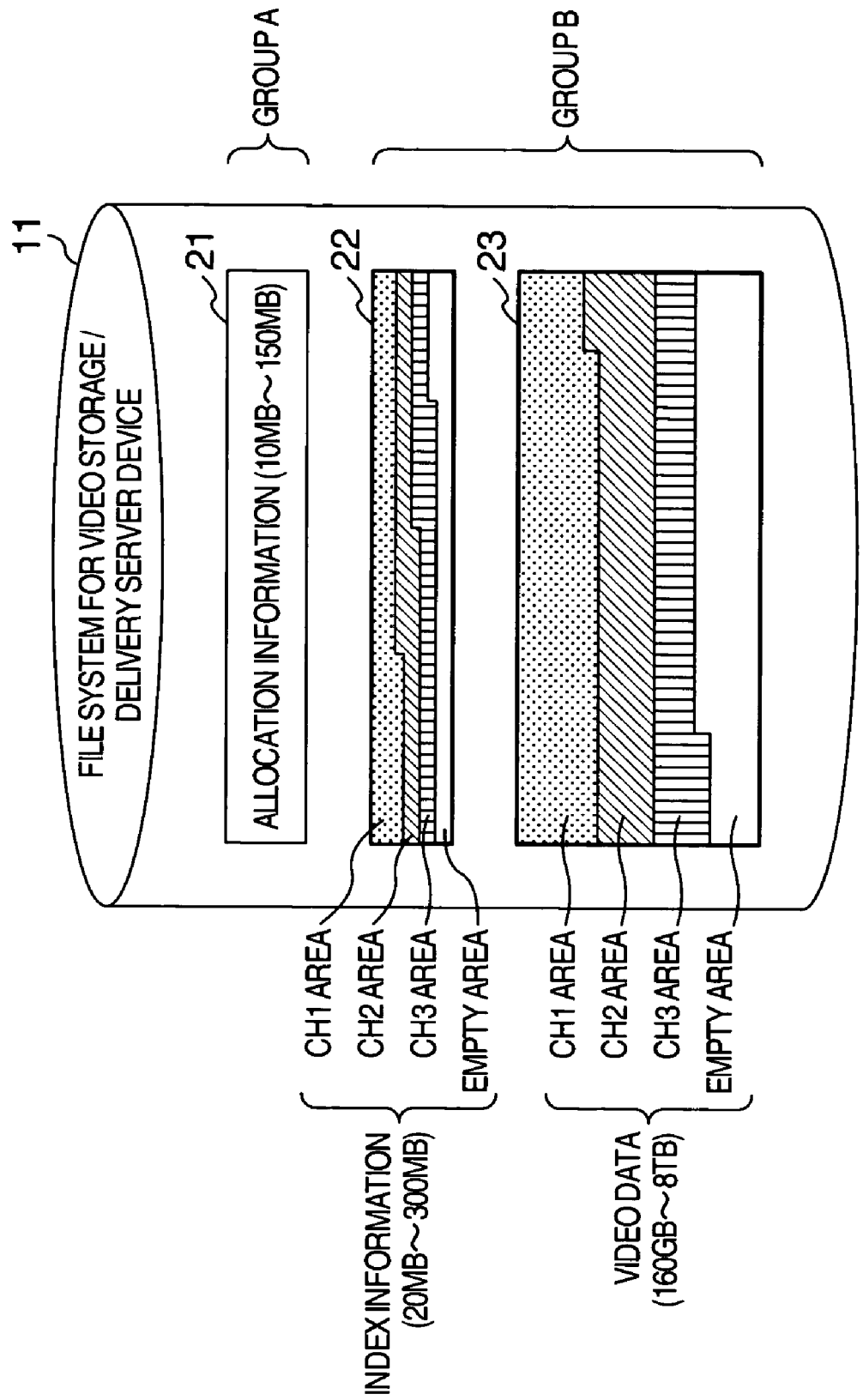
FIG. 3 is a diagram illustrating an example of a channel area in the file system.

FIG. 3 shows an example of a channel area in the circulating recording file system 11.

As shown, areas are allocated for a plurality of channels in order in an area for recording the index information 22 and an area for recording the video data 23, respectively, followed by a free area, if any. In this way, the areas are divided on a channel-by-channel basis for the index information 22 and video data 23. While three channels (CH1-CH3) are shown in the example of FIG. 3, the number of channels may be arbitrary.

As described above, in the file system 11, an area for recording the index information 21 or video data 23 can be divided on a camera-by-camera basis (on a channel-by-channel basis). In this embodiment, such an index information recording area or video data recording area for each channel is called the "channel area," which corresponds, for example, to circulating recording area A1-Am for each channel. The area for recording the index information 21 and the area for recording the video data 23 may be provided for use in correspondence to some channels, or alternatively, the entire area may be used in correspondence to a single channel.

The creation of the channel area and a change in size therefor have been completed before video data 23 is recorded.

The size of the channel area is not changed while a program is operating for recording and reading the video data 23.

The video data 23 on each channel is circularly recorded in each channel area. In other words, after the video data 23 has been recorded to the end of each channel area, the recorded video data 23 is overwritten from the beginning.

Here, FIG. 3 shows a exemplary logical image, where the video data 23 is collected on each channel, but data is actually recorded in physically discrete areas. This is because several deletions or creations of the channel area result in difficulties in ensuring a continuous area. Therefore, each channel area of the video data 23 may be discrete in its physical allocation, in which case arbitrary video data can even be accessed in each channel area by holding a table in which the allocation information 21 or index information 22 shows "which video data of each channel area is allocated where on a disk." As is the case with each channel area of the video data 23, each channel area of the index information 22 may also be discrete in its physical allocation.

Figure 4:
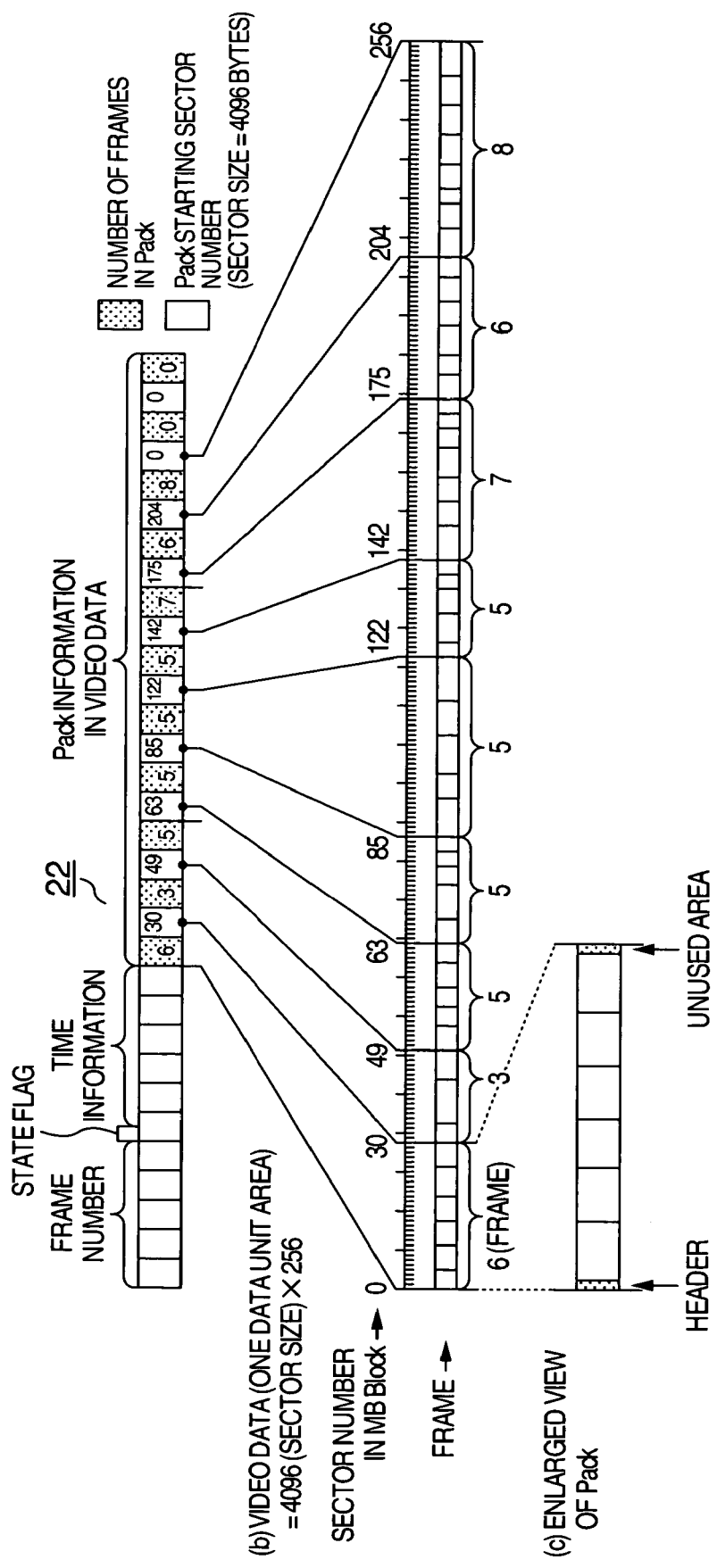
FIG. 4 is a diagram showing an example of (a) one index information unit, (b) a diagram showing an example of one video data unit, and (c) a diagram showing an example of a pack, respectively.

As will be later described, the index information recording area 22 is comprised of a plurality of index unit areas, where the index information is divided and recorded in the index unit areas. In FIG. 4, (a) shows an example of 32-byte index information 22 recorded in one index unit area of a certain channel area. The video data recording area 23 is also divided into a plurality of data unit areas, such that video data is divided and recorded in the plurality of data unit areas. One data unit area corresponds to one index unit area. The index information 22 in one index unit area corresponding to the video data 23 in one video unit area, includes, for example, information on a frame number of the first frame, information on a state flag, information on the time, and information on a pack in the video data 23, in regard to the video data 23 in the unit area. The pack information provides information on the number of frames in the first pack of a plurality of packs possessed by the video data 23 in one data unit area, and provides a set of information on a sector number at which a pack starts, and information on the number of frames in the pack for the second pack onward, and a number of the sets are arranged side by side as much as the number of packs except for the first pack.

In FIG. 4, (b) shows an example of the video data 23 in one data unit area recorded in the certain channel area. The video data 23 in one data unit area has (4096×256) bytes. Assume herein that a sector has a size of 4096 bytes, the sector number takes a value in a range of 0 to 255, and the sector number (256) is regarded as the same as the sector number "0." The shown example uses sector numbers in a macro-block (MB).

The video data 23 in one data unit area is comprised of a plurality of packs, each of which includes a plurality of frames. The number of frames in each pack, and a starting sector number of each pack are identified by the pack information in the corresponding index information 22.

In FIG. 4, (c) shows an example of one pack. A header is provided at the beginning of each pack, at which the pack is delimited, and an unused area of less than one sector can remain at the end of each pack, at which the pack is divided. The header in the pack preserves a starting position of each frame (in bytes) and the time of the frame.

It should be noted that the frame is populated into a pack from the beginning, so that the beginning of a sector does not necessarily match the beginning of a frame.

As described above, a plurality of frames (video frames) exist in the video data 23 in one data unit area. In this embodiment, video data is written using a method of writing the video data into a disk from one unit area to another, while data is read using either a method of reading the data from a disk from one frame to another or a method of reading the video data from the disk from one unit area to another.

Here, a time required to read data from a disk is the sum of a constant overhead time irrespective of the amount of data, and an actual reading time proportional to the amount of data.

Therefore, continuous data should be read in larger data sizes because of a reduced number of times of overhead. Therefore, when sequential frames are read, an entire unit area of video data is more suitably read because of a shorter time required therefor.

On the other hand, when one arbitrary frame alone is required in video data, a read in smaller units is more advantageous than a read of one entire unit area of video data because of a shorter time required therefor. Accordingly, one unit area of video data is divided into a plurality of sub-areas such that video data can be read in sub-areas. In this embodiment, this sub-area is called the "pack."

In this way, video data is read from one unit area to another when a continuous data is read, and data is read in packs when discontinuous data is read (random access), thereby making it possible to provide a reading method which is suited to both sequential accesses and random accesses.

In this embodiment, one unit area of video data is set to 1 Mbyte, one sector size to 4096 bytes, and one unit area of index information is set to 32 bytes. Also, a maximum number of packs in one unit area of video data is set to 11 in view of a tradeoff with the number of bytes in one unit area of index information.

As described above, the index information 22 has information for identifying a starting sector in each pack, and the number of frames in each pack (in one unit area of video data).

The index information 22 also has a flag (state flag) indicative of the state of the video data 23. In this embodiment, the state flag takes three significant values, a value indicative of a "state in which video data is not recorded (unused state)"; a value indicative of a "state in which video data is recorded (normal state)"; and a value indicative of a "state in which index information indicates a dummy value due to damaged video data (damaged state)."

Here, a description will be given of factors which cause damages to recorded contents.

A main cause of a damage is a shut-down of a system due to an unintentional power failure during a write into a disk.

For example, an error occurs if what should be written is not written. Also, an "indefinite write" could arise, though quite rarely, wherein data is written into an unspecified area.

While it is contemplated that information in the file system is damaged with certain intention (or due to a bug) from another application, this scenario is not taken into consideration in this embodiment. Such a damage can be prevented by a security means which, for example, limits applications that are allowed to access the video file system 11.

When information in Group A (allocation information 21 in this example) is damaged due to a power failure during a change in area, the information is incompletely updated, resulting in a mixture of new and old information in the file system 11 which is no longer significant. On the other hand, if Group A is damaged due to an indefinite write upon power-off, information in Group A is overwritten by the indefinite write to erase correct information, resulting in an insignificant system file.

Information in Group B (index information 22 and video data 23 in this example) may be damaged due to a power-off at a timing at which the video data 23 is being written into a disk. There are three patterns of data being written halfway in a write, as follows: (1) the index information 22 has been written up to the middle; (2) the video data 23 has been written up to the middle; and (3) the video data 23 has been updated, whereas the index information 22 has not been updated. In any of the patterns, an information error occurs between the index information 22 and video data 23, resulting in an unknown boundary between the oldest image and latest image in the channel area. After the system is re-started, no access can be made to the damaged channel area.

On the other hand, when Group B is damaged due to an indefinite write upon power-off, where the index information 22 is damaged, the continuity of the index information 22 is lost, video data cannot be searched, and no access can be made to an associated channel area after a re-start. Also, when the video data 23 is damaged, the damaged video data 23 will be outputted as it is damaged.

Next, countermeasures to damages will be described.

Figure 5:
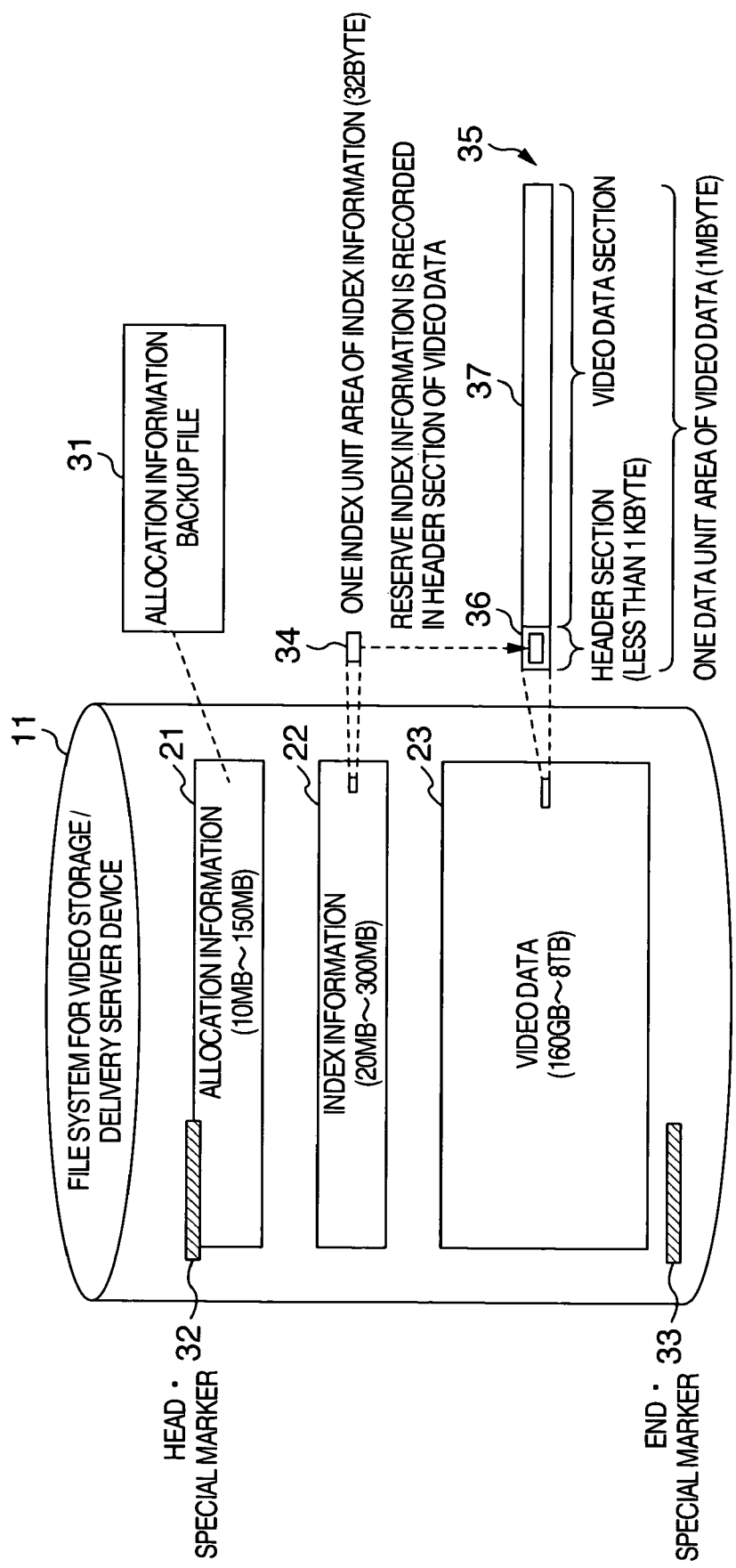
FIG. 5 is a diagram generally showing countermeasures to a damage.

The countermeasures to damages will be generally shown with reference to FIG. 5.

For Group A (allocation information 21 in this example), the following (Countermeasure 1), (Countermeasure 3), and (Countermeasure 3) may be taken.

(Countermeasure 1) Each time an area changing tool is used, a backup file 31 is created for Group A, and held in another disk area.

(Countermeasure 2) A check sum (hash value) for verifying the presence or absence of a damage is added to the data on the file system 11 and backup file 31.

(Countermeasure 3) Two special markers (32, 33) are used to indicate that a disk is used as the file system 11 for the video accumulation/delivery server device, and described at the beginning and end of the disk. The probability that the two special markers 32, 33 are simultaneously damaged is lower than the probability that one special marker is damaged when there is the one special marker alone.

For Group B (index information 22 and video data 23 in this example), (Countermeasure 4) and (Countermeasure 5) may be taken.

(Countermeasure 4): Video index information is recorded in a total of two areas, i.e., in an index unit area for index information and in a header section of each data unit area for video data. Specifically, in the example of FIG. 5, in addition to index information 34 in an index unit area recorded in the index information area 22, the same index information (reserve index information) is recorded in a header section 36 provided at the beginning of the video data 35 recorded in a data unit area for recording the video data 23 corresponding to this index unit area. The video data 35 in the data unit area is comprised of the header section 36 and a data section 37, where the header section 36 has a length of, for example, less than 1 Kbyte. Then, if the index information area 22 is damaged, a recovery is made based on the reserve index information recorded in the header section 36 of the video data 23.

(Countermeasure 5): In this embodiment, damaged video data 23 is treated as a damaged location because it cannot be recovered. A determination is made possible as to whether or not data is damaged or normal, and when a video data area including a damaged location is requested from any of the client terminal devices C1-Cn, message information is transmitted to the client terminal device C1-Cn for informing that the data area cannot be transmitted because it is damaged.

Actions taken when damaged information is found in Group A involve recovering damaged information based on information in the backup file 31.

Actions taken when damaged information is found in Group B involve recovering the index information 22 and video data 23 from errors using the context, and index information in the header section 36 on the video data 23. Also, in this embodiment, damaged video data 23 is not recovered, but since the circulating recording scheme is employed, as the video data 23 is continuously recorded (accumulated), the damaged location of the video data 23 will be overwritten sometime and disappear.

The video file system 11 cannot be recovered when the hard disk is physically damaged, and when partition information on the hard disk is damaged.

For example, if Group A is damaged at both ends, specifically, if the special marker 32 at the beginning of the video disk, and the special marker 33 at the end are damaged at the same time, this video disk cannot be recovered because this disk cannot be distinguished from a blank disk, so that information should be read from the backup file 31, or the file system 11 should be newly created. In this event, if not only information in Group A but the backup file 31 are damaged, the file cannot be recovered because there is no information required for recovery, so that the file system 11 should be newly created.

Also, video data 23 in Group B, if damaged, cannot be recovered, so that upon request for damaged video data 23, a message is transmitted for informing that the video data 23 is damaged, and upon request for normal video data 23, this video data 23 is transmitted.

Next, processes of damage countermeasures will be described in a specific manner. In this embodiment, the disk device 2 or video accumulation/delivery server device 1 is provided with a function of executing the processes of damage countermeasures to recording areas including the circulating recording areas A1-Am (respective channel areas of the file system 11) of the respective channels.

Figure 6:
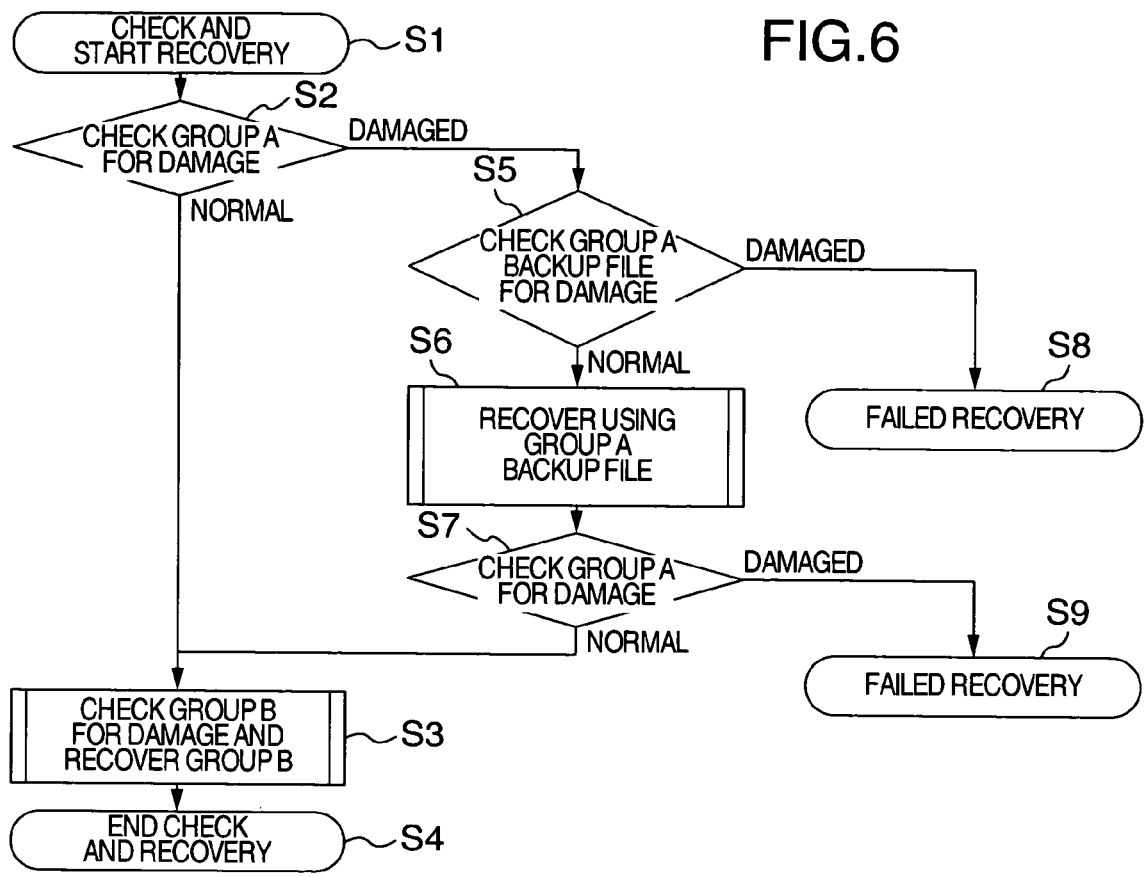
FIG. 6 is a diagram illustrating an exemplary procedure of a process for checking a recorded content for a damage and recovering the content from the damage.

FIG. 6 illustrates an exemplary procedure of a process for checking recorded contents for a damage and recovering the contents from the damage.

As the process is started (step S1), information in Group A is checked for a damage (step S2). When the information in Group A is not damaged and therefore is normal, information in Group B is checked for a damage and recovered (step S3), followed by termination of the process (step S4).

On the other hand, when any damage is found in the information in Group A, the backup file 31 for the information in Group A is checked for a damage (step S5). When the backup file 31 is not damaged and therefore is normal, allocation information 21 is written back based on the backup file 31 to recover the information in Group A (step S6). Subsequently, the information in Group A is checked for a damage (step S7). When the information in Group A is not damaged and is therefore normal, the information in Group B is checked for a damage and recovered (step S3), followed by termination of the process (step S4).

When any damage is found in the backup file 31 for the information in Group A (step S5), the recovery is regarded as a failure (step S8). On the other hand, when any damage is found in the information in Group A even after a recovery based on the backup file 31 (step S7), the recovery regarded as a failure (step S9).

Figure 7:
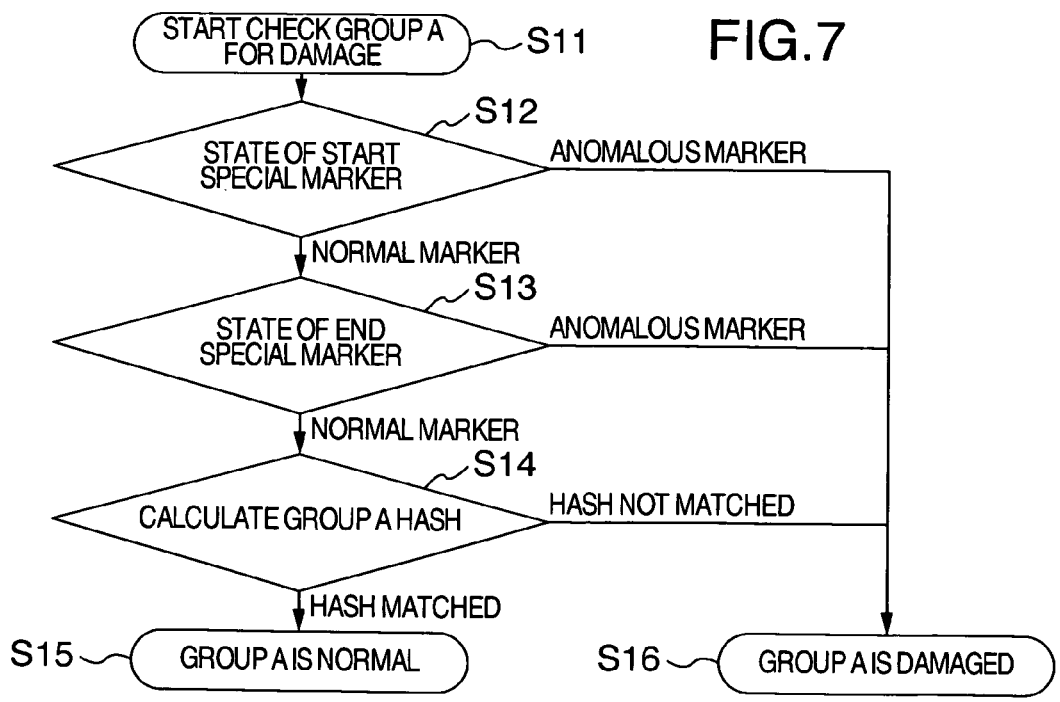
FIG. 7 is a diagram illustrating an exemplary procedure of a process for checking a recorded content for a damage in a group A.

FIG. 7 illustrates an exemplary procedure of a process for checking recorded contents of information in Group A for a damage.

As the process is started (step S11), the special marker 32 at the beginning is checked for the state (step S12). When the special marker 32 is normal, the special marker 33 at the end is checked for the state (step S13). When the special marker 33 is normal, a hash value is calculated for Group A (step S14). When the hash value matches a normal value, Group A is determined to be normal (step S15).

On the other hand, when the special marker 32 at the beginning is anomalous, or when the special marker 33 at the end is anomalous, or when the hash value does not match the normal value, Group A is determined to be damaged (step S16).

Figure 8:
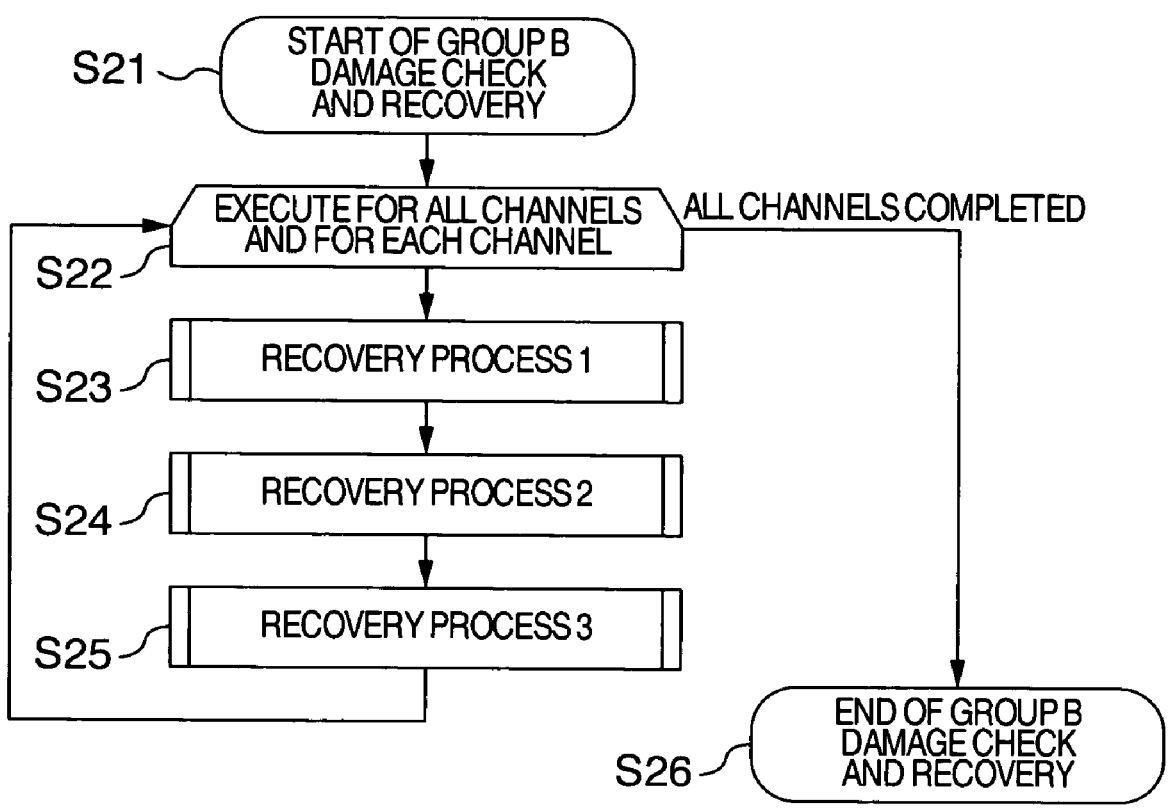
FIG. 8 is a diagram illustrating an exemplary procedure of a process for checking a recorded content for a damage in a group B and recovering the content from the damage.

FIG. 8 illustrates an exemplary procedure of a process for checking recorded contents of information in Group B for a damage and recovering the contents.

As the process is started (step S21), a predetermined recovery process 1 is executed (step S23), a predetermined recovery process 2 is executed (step S24), and a predetermined recovery process 3 is executed (step S25) for each of all channels (step S22). Then, after the recovery processes 1-3 have been completed for all the channels, the process for checking the information in Group B for a damage and recovering the information is terminated (step S26).

Now, the recovery processes 1-3 for information in Group B will be described in greater detail.

The recovery process 1, recovery process 2, and recovery process 3 are executed in this order from one channel area to next.

Information used during a recovery will be described with reference to (a), (b) and (c) of FIG. 9.

In FIG. 9, (a) shows an example of an area for the index information 22 for each channel.

Assuming that M represents the number (channel size) of data unit areas of video data which can be stored in the channel area of the video data 23, M also represents the number of index unit areas of index information which can be stored in the channel area of the corresponding index information 22.

Also, in this embodiment, a number L1 represents the ordinal position of information in an area, i.e., the address or position within the area. Also, the L1 number for the first element in the area is set to zero, in which case the last element is given the L1 number set to (M−1).

In FIG. 9, (b) shows an example of an area of the video data area 23 in each channel.

The number of video data units which can be stored in a channel area of the video data 23 is represented by M.

The video data 35 in one data unit area is comprised of a header section 36 and a video data section 37. The header section 36 has information (reserve index information) which is a copy of the index information of a corresponding index unit area, information on a channel number, information on a channel creation time, and information on a video data number.

Here, the information on a channel number is information on a number for identifying each channel.

The information on a video data number is information on a number of a video data unit, and indicates at which ordinal time the video data unit was created. In this embodiment, the video data number is a serial number from zero (i.e., 0, 1, 2, 3, ...) and is not returned but increased even after an overwrite is started. A video data unit having the video data number N is given the L1 number which is equal to N % M (a residual resulting from a division of N by M) minus one. Specifically, when $N \leq M$, $L1=N-1$, and when $N=pM+q$ (p is an integer equal to or larger than one, and q is an integer equal to or smaller than M), $L1=q-1$.

Also, each channel has information on the channel size M, information on a channel creation time indicative of when the channel was created, and information on a size change minimum video data number indicative of a minimum video data number immediately after a change in channel size. In this embodiment, these three types of information are collectively called the "channel information."

In FIG. 9, (c) shows an example of a check queue area in each channel.

In this embodiment, a check queue having M elements, equal in number to the index unit areas of the index information in a channel (i.e., equal in number to the video data units in the channel), is provided in order to inform conditions, such as whether a damaged area has been recovered or suspended, and the like, to the recovery process at a later time.

While an area in which information in the check queue is recorded may be provided in an arbitrary device, the check queue resides in a memory of the video accumulation/delivery server device 1 in this embodiment. Alternatively, the check queue may be included in a table which is reserved on a memory of a personal computer (not shown) for controlling a variety of processes in this system. In one example, such a personal computer can be connected to the video accumulation/delivery server device 1 through the network 3, such that a check of contents stored in the disk device 2, a recovery of the disk device 2, and the like can be remotely instructed from the personal computer.

The recovery process 1 will be described in detail with reference to (a), (b) and (c) of FIG. 10.

In FIG. 10, (a) shows an example of an area of the index information 22 in each channel, (b) shows an example of an area of the video data in each channel, and (c) shows an example of an area of the check queue in each channel.

The recovery process 1 involves examining whether or not index information (each index unit area) recorded in the area of the index information 22 is damaged, and reading the index information from the area of the header section 36 of the video data 35 in a corresponding data unit area for recovery if the index information 22 is damaged.

Specifically, as shown in (a) of FIG. 10, it is examined whether or not the index information is damaged in each of the index unit areas in the area of the index information 22, for example, in an ascending order of the L1 number (in the order of 0, 1, 2, ...). When a damaged index unit area is found, video data recorded in a data unit area of the video data 23 corresponding to the damaged index unit area is read, as shown in (b) of FIG. 10. When the read video data is normal, the index information in the damaged index unit area is recovered using the reserve index information in the header section 36 of the video data in that data unit area. When the data unit area of the video data is damaged, the recovery of the index information is suspended.

Also, as shown in (c) of FIG. 10, information indicative of a recovered state, or information indicative of a suspended state is described at a position corresponding to the index unit area (and video data unit area) in the area of the check queue in accordance with the situation of the check and recovery. When no check has been made on corresponding video data in order to check the index unit area for a damage, information indicative of an unchecked state is described at a corresponding position within the area of the check queue.

Here, the determination as to whether or not index information in an index unit area is damaged is made, for example, based on whether or not 32 bytes which make up the index unit area satisfy a predetermined condition.

In this embodiment, the determination as to whether an index information unit is damaged is made based on whether or not starting sector numbers in respective packs possessed by index information of the index unit area are arranged in an ascending order, and whether or not the state flag within the index unit area indicates a significant value. The index information unit is determined not to be damaged when the starting sector numbers of the respective packs are arranged in the ascending order, and when the state flag indicates a significant value, and otherwise, the index information unit is determined to be damaged. In this embodiment, there are three significant values taken by the state flag: a value indicative of a "state in which video data is not recorded (unused state)"; a value indicative of a "state in which video data is recorded (normal state)"; and a value indicative of a "state in which the index information indicates a dummy value because of damaged video data (damaged state)."

When the index unit area is damaged, it is confirmed whether or not the index unit area can be recovered based on the reserve index information on the header section 36 of the video data in a corresponding data unit area.

In this embodiment, before the reserve index information is read from the area of the header section 36 of the video data in the data unit area, it is first confirmed whether or not the video data in this data unit area is normal.

Specifically, the determination as to whether or not the video data in the data unit area is normal is made to confirm whether the video data is in a "normal state" or an "unused state" or a "damaged state." Here, the state of the video data is examined in the corresponding data unit area, for example, without referencing the state flag of the index information in the damaged index unit area. In another example, such a state flag in the index unit area could be referenced or consulted.

The "unused state" of a data unit area indicates a state in which the data unit area is not at all used, or a state in which data of a previous channel remains in the data unit area. For example, when the header section 36 does not exist in the data unit area, or when the header section 36 does exist in the data unit area but a channel number of the header section 36 is different from an actual one, or when the header section 36 does exist in the data unit area, but a channel creation time does not match the channel information, or when the header section 36 does exist in the data unit area, but a video data number is equal to or smaller than the size change minimum video data number of the channel information, the data unit area is determined to be in the "unused state" because no effective video data is described therein.

The "damaged state" of a data unit area in turn indicates a state in which data is damaged. For example, when the header section 36 at the beginning of the data unit area and the header in each pack do not exist at positions indicated by the index information, i.e., when video data has not normally written, or when a value within the header section 36 possessed by the data unit area is out of a predetermined range, or when a value within the header of each pack is out of a predetermined range, the data unit area is determined to be in the "damaged state" in which data is damaged in the data unit area.

The "normal state" of a data unit area in turn indicates that the data unit area is not in the "unused state" or in the "damaged state." In other words, the data unit area is determined to be in the "normal state" when it is not in the "unused state" or in the "damaged state."

When the result of the determination shows that the data unit area is in the "normal state," it is determined whether or not the reserve index information is damaged on the header section 36 of the data unit area. When the reserve index information is not damaged, this reserve index information is employed to recover the damaged index information 22, and the recovery is recorded in the corresponding check queue. On the other hand, the reserve index information is damaged on the header section 36 of the data unit area, the data unit area is determined to be recovery impossible, and a suspended recovery is recorded in the corresponding check queue.

When the result of the determination shows that the data unit area is in the "unused state" or "damaged state," a recovery is suspended, and the suspended recovery is recorded in the corresponding check queue.

The determination may be made as to whether or not the index information is damaged, for example, in a manner similar to the foregoing. Alternatively, in another configuration, a check sum may be used in order to determine whether or not the index information and video data are damaged.

The recovery process 2 will next be described in detail with reference to FIGS. 11A, 11B and 12A, 12B.

In this embodiment, a plurality of frames exist in a data unit area of video data. The index information 22 (index unit area) holds frame information which includes a frame number of the first frame within a corresponding data unit area of the video data, and the number of frames. In a normal state, the frame numbers are continuous between two adjacent data unit area, i.e., a relationship expressed below is established:

(First Frame Number+Number of Frames in Certain Data Unit Area)=(First Frame Number of Next Data Unit Area)

In this embodiment, when the above relation is not established at a location, this location is called "discontinuous."

The frame number is independent from one channel to another, is a serial number from zero, and is given to all frames to be recorded.

The frame numbers are discontinuous between adjacent data unit areas at a boundary of the latest data unit area with the oldest data unit area, or in a state in which an update is failed in the index information in the index unit area, i.e., when a discrepancy, i.e., an error occurs between a data unit area and a corresponding index unit area.

FIG. 11A shows (a) an example of the index channel 22 for one channel, and (b) an example of the video data 23 for one channel corresponding to the index channel 22 in the normal state. When the index information 22 and video data 23 are overwritten, the frame numbers are discontinuous only at the boundary of the latest frame number with the oldest frame number in the normal state. In FIG. 11A, vertical hatching represents old written information, and oblique hatching represents newly written information which has been overwritten on the old written information.

FIG. 11B shows (a) an example of the index information 22 for one channel, and (b) an example of the video data 23 for one channel corresponding thereto in a state where an anomaly has occurred, for example, due to a failed update in part of the index information 22. In this event, discontinuous index information is found in addition to the boundary of the latest one with the oldest one. In other words, a plurality of discontinuous locations exist in the entire index information area. In FIG. 11B, vertical hatching represents old written information, and oblique hatching represent newly written information which has been overwritten on the old written information.

For checking the index information for the discontinuous state (for the continuous state, to put it in another way), the check should be made both in an ascending order and a descending order because a check in either the ascending order or the descending order can be insufficient for the discontinuous state.

In a check for the discontinuous state in the ascending order, index unit areas in the index information area 22 are checked in the ascending order of the L1 number from one to (M−1).

Specifically, for checking an index unit area which has the L1 number equal to P, (Check Process 1) to (Check Process 3) are performed. When any of (Check Process 1) to (Check Process 3) has been performed for a certain index unit area, other check processes need not be performed for this index unit area.

(Check Process 1)

When an index unit area having the L1 number equal to P (an arbitrary positive integer) and an index unit area having the L1 number equal to (P−1) differ in the state of data unit areas corresponding thereto ("normal state," "unused state," "damaged state") based on the state flag, a check is made on a data unit area corresponding to the index unit area having the L1 number equal to P. When the result of the check shows that the data unit area is in the "normal state," a determination is made as to whether or not the reserve index information is damaged on the header section 36 of that data unit area. When the reserve index information is not damaged, the reserve index information on the header section 36 of the data unit area is employed to recover the index information in the corresponding index unit area, and the recovery is recorded in a corresponding check queue. On the other hand, when the reserve index information is damaged on the header section 36 of the data unit area, the index information 22 is determined to be recovery impossible, and a suspended recovery is recorded in the corresponding check queue. Also, when the data unit area is in the "unused state" or "damaged state," a recovery is suspended, and the suspended recovery is recorded in the corresponding check array.

The determination as to the state of the data unit area, and the determination as to the damage of the reserve index information on the header section 36 of the data unit area can be made, for example, in a similar manner to the recovery process 1 described above.

(Check Process 2)

When the check queue corresponding to the index unit area (and data unit area) having the L1 number equal to (P−1) indicates that a "recovery" has been made or a recovery is "suspended," the same process as the aforementioned Check Process 1 is performed for the index unit area and data unit area having the L1 number equal to P.

(Check Process 3)

When the data unit area corresponding to the index unit area having the L1 number equal to P, and the data unit area corresponding to the index unit area having the L1 number equal to (P−1) are both in the "normal state," but the frame numbers are discontinuous based on the frame information included in these index unit areas, the same process as the aforementioned Check Process 1 is performed for the index unit area and data unit area having the L1 number equal to P.

In a check for the discontinuous state in the descending order, in turn, index unit areas in the index information area 22 are checked in the descending order of the L1 number from (M−2) to zero.

Specifically, for checking the index unit area having the L1 number equal to P, processes are performed in a manner similar to (Check Process 1) to (Check Process 3) involved in the check in the ascending order, wherein since the check is made in the reverse order, (P−1) is replaced with (P+1) in performing each of (Check Process 1) to (Check Process 3) described above. When any of (Check Process 1) to (Check Process 3) has been performed for a certain index unit area, other check processes need not be performed for this index unit area.

FIG. 12A shows (a) an example of the index information 22 for one channel, and (b) an example of the video data 23 for one channel corresponding thereto when errors occur in the index information 22 and video data 23, wherein a check in the ascending order shows that the index information 22 can be recovered at and after a discontinuous point on the index information 22. In this embodiment, an error is found in a hind side (on the right-hand side in the figure) of a discontinuous location in the index information 22. Thus, by defining a rule that the index unit area next to (behind) a recovered index unit area must be checked for error without fail, the index unit areas can be compared (recovered in this embodiment) with the reserve index information on the data unit areas sequentially at and after the discontinuous point.

FIG. 12B shows (a) an example of the index information 22 for one channel, and (b) an example of the video data 23 for one channel corresponding thereto when errors occur in the index information 22 and video data 23, wherein a check in the ascending order shows that the index information 22 cannot be recovered at and after a discontinuous point on the index information 22. In this event, since the data unit areas are determined to be normal at and after the discontinuous location on the index information 22 in the ascending direction, the errors cannot be found, in which case the index unit areas are not compared (recovery in this embodiment) with the reserve index information on the data unit areas.

In this embodiment, therefore, a check in the descending order is also made in addition to the check in the ascending order, whereby the index information 22 and video data 23 can be sequentially recovered from the errors at and after the discontinuous location in the descending direction.

The recovery process 3 will be described in detail with reference to FIGS. 13 and 14.

In the recovery process 3, (Process 3-1), (Process 3-2), and (Process 3-3) are performed.

(Process 3-1)

The video data 23 is searched for the latest unit area and the oldest unit area.

(Process 3-2)

The state flag in the index information 22 is set to a value indicative of the "unused" state except for the section between the found latest unit area and oldest unit area.

(Process 3-3)

The index information 22 is confirmed whether or not it is continuous in the section between the found latest unit area and oldest unit area. As a result, when a discontinuous location is found, this location is treated as a damaged location, and dummy index information 22 is generated and recorded such that the index information is continuous before and after the damaged location. This (Process 3-3) is applied, for example, when the index information 22 of the video data still remains discontinuous even after (Check Process 3) has been performed in the aforementioned recovery process 2, or to a location for which "suspended" is described in the check queue.

The state flag in the index information 22 indicates the "normal state," or "unused state," or "damaged state (dummy state)." In this embodiment, when a corresponding state flag indicates the "damaged state (dummy state)" upon delivery of the video data 23, the client terminal devices C1-Cn are notified that the video data 23 is damaged.

Figure 13:
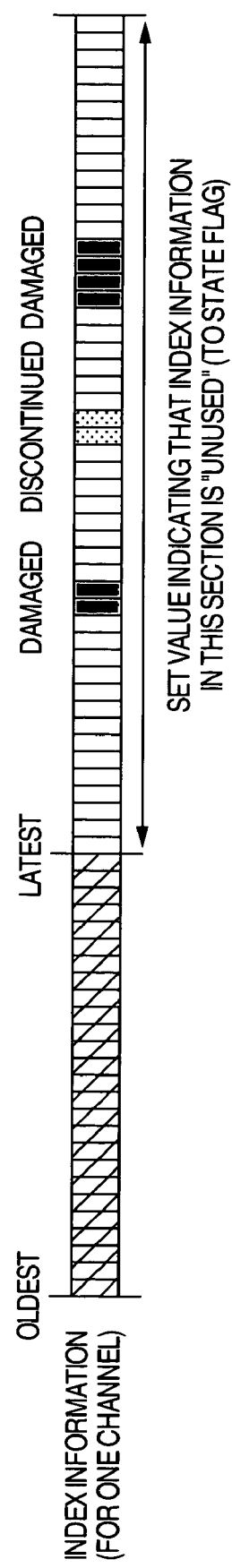
FIG. 13 is a diagram for describing a process for setting predetermined index information to a "unused" state.

FIG. 13 shows an example of the index information 22 for one channel. In (Process 3-2) described above, by setting the index information 22 to the "unused" state except for the section between the index unit area corresponding to the oldest data unit area and the index unit area corresponding to the latest data unit area, for example, a damaged region and a discontinuous point, if any, can be cleared.

Figure 14:
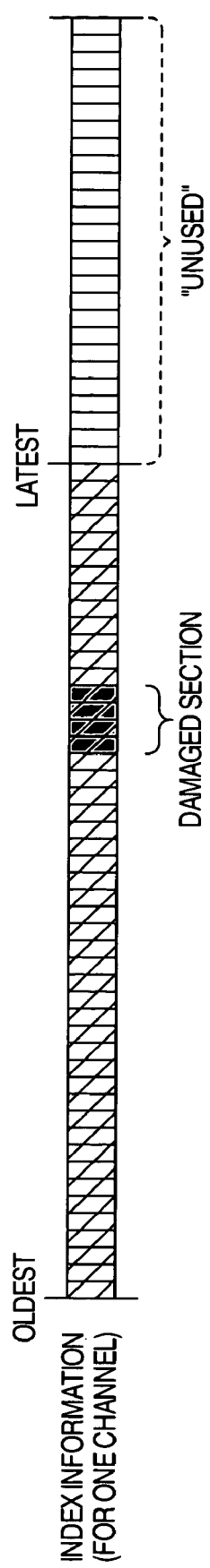
FIG. 14 is a diagram showing an example of index information for one channel when an error occurs in index information and video data.

FIG. 14 shows an example of the index information 22 for one channel when errors occur in the index information 22 and video data 23. In (Process 3-3) described above, when one or more damaged sections are found in the section between the index unit area corresponding to the oldest data unit area and the index unit area corresponding to the latest data unit area, the number of missing frames is calculated based on the normal index information 22 before and after the damaged section, and dummy index information 22 (for example, information related to the number of the first frame, time, the number of frames, and the like) is created and recorded in the damaged section. A state flag indicative of a dummy is recorded in the index information 22 in which the dummy has been created.

In this embodiment, when an anomaly (damage) is found in the aforementioned recovery process 1 or recovery process 2, the index information 22 is recovered, if possible, but the recovery is suspended if there is no normal information available for recovering the index information 22, and recovered in a later recovery process.

Also, a processing time required for the recovery can be reduced by performing the recovery process 1 and recovery process 2. In addition, the recovery process 1 and recovery process 2 can be omitted if the processing time is not taken into consideration.

Also, when the processing time is not taken into consideration, all index information stored in the header section 36 of the video data 23 is preferably read for comparison with the index information in the index information area 22, and index information is created again if they differ from each other. Generally, however, a longer time is required for reading information which is distributed on a disk, so that a longer time can be taken for comparing all index information.

For example, a large load can be imposed by a process of reading all index information from the header sections 36 of the video data which are located at equal intervals on a disk, i.e., distributed on the disk, and creating again the index information.

To avoid this problem, the recovery processes 1-3 of this embodiment, can reduce the number of times the header section 36 is read from the video data 23, and consequently can reduce a total time required for the process by reading the index information from the header section 36 of the video data 23 in a predetermined case. For example, in the recovery process 2, the header sections 36 of the video data 23 are read only from those areas in which it is estimated that the index information 22 is likely to be damaged.

As described above, the disk device 2 of the video accumulation/delivery server device 1 records the index information of the video data 23 in a total of two areas, i.e., an area for the index information 22 and the index section 36 in each data unit area of video data in the video accumulation/delivery system of this embodiment. Then, if the area for the index information 22 is damaged, this area is recovered based on the reserve index information recorded in the header section 36 of the video data 23.

Also, in this embodiment, the recovery processes 1-3 are performed in the manner described above, and the index information 22, if damaged, can be recovered in a shorter time, for example, through the recovery process 1 and recovery process 2.

Accordingly, in this embodiment, recorded contents can be effectively recovered from an error which has occurred therein, for example, by a recovery method suitable for the circulating file system 11.

In this embodiment, the recording apparatus is implemented by functions of the video accumulation/delivery server device 1 and functions of the disk device 2 or by functions of another controller such as a personal computer.

In the recording apparatus of this embodiment, the circulating recording areas A1-Am of the disk device 2, which provides memory areas for recording the video data 23 and index information 22, implement a data recording area which is an area for recording the video data 23, and an index information recording area which is an area for recording the index information 22.

Also, in the recording apparatus of this embodiment, the video accumulation/delivery server device 1, for example, records index information (reserve index information) of an index unit area in the header section 36 of the video data 35 in the data unit area corresponding thereto, and recovers the index information 22 from an error based on the reserve index information.

Further, in the recording apparatus of this embodiment, a check queue area, which is an area for recording values of the check queue as shown in FIG. 9(c), is reserved, for example, in an external controller.

The system and respective apparatus according to the present invention is not necessarily limited to the configurations shown above, but may take a variety of configurations. The present invention can also provide, for example, methods or schemes for executing processes according to the present invention in the form of a program for implementing such methods and schemes, or a recording medium for recording the program, or the like. Alternatively, the present invention can also implement such methods and schemes in a variety of apparatuses and systems.

The present invention is not necessarily limited to the applications shown above, but can be applied to a variety of fields.

A variety of processes performed in the system, each apparatus and the like according to the present invention may be controlled, for example, by executing a control program stored in a ROM (Read Only Memory) by a processor which is included in hardware resources that comprise the processor, memories and the like. Alternatively, the processes may be implemented, for example, in hardware circuits in which respective functional means execute the processes independently of one another.

The present invention can also be implemented in a computer readable recording medium such as a floppy (registered trademark) disk, a CD (Compact Disc)-ROM or the like which has stored thereon the control program mentioned above, or in the program (itself), wherein the processes according to the present invention can be carried out by loading the control program from the recording medium into a computer, and causing a processor to execute the control program.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording apparatus which employs a circulating recording scheme for overwriting the oldest recorded data in a recording area having a limited storage capacity with the latest recorded data, said recording apparatus comprising:

a memory device including a data recording area for recording data, an index information area for recording index information related to the data recorded in said data recording area, and a reserve index information area provided in part of said data recording area for recording substantially the same index information as the index information; and data recovering means operative when an error is found in index information recorded in said index information area for recovering the index information in said index information area based on the index information in said reserve index information area, wherein said data recording area includes a plurality of data unit areas, wherein the recorded data is divided and recorded in each unit area, wherein said index information area includes a plurality of index unit areas, wherein said index information is divided and recorded in each said index unit area corresponding to the data unit area, wherein said recovering means checks the index information from one index unit area to another for an error, and recovers index information from the error in an index unit area which is determined to include the error wherein said data recording area records data of a plurality of video frames, and each of the plurality of video frames is given a serial number, wherein said index information unit area records index information which includes frame information indicative of a first frame number and the number of video frames recorded in a data unit area corresponding to said index unit area, and a state flag for identifying whether data in said data unit area is in a normal state, or in an unused state, or in a damaged state, wherein said recording apparatus further comprises a check queue area for recording whether each of data in said plurality of data unit areas recorded in said data recording area is in a recovered state, or in a suspended state, or in an unchecked state, and wherein said recovering means checks said plurality of data unit areas and index unit areas for an error based on the information recorded in said state flag and the information recorded in said check queue area.

2. A recording apparatus according to claim 1, wherein said recovering means checks whether the index information satisfies a predetermined condition between adjacent index unit areas in a plurality of continuous index unit areas of said index information area, determines that an error exists in said index unit areas when the predetermined condition is not satisfied, checks whether or not a data unit area corresponding to the index unit area determined to include an error is normal, recovers the index information in the index unit area which is determined to include an error based on the index unit area of the reserve index information area provided in part of the normal data unit area when the checked data unit area is normal, and records the state flag in a location of said check queue area corresponding to the recovered index unit area for indicating that the information is recovered.

3. A recording apparatus according to claim 2, wherein said recovering means checks whether or not a data unit area corresponding to the index unit area which is determined to include an error is normal, does not recover the index information in the index unit area which is determined to include an error when the checked data unit area is not normal, and records the state flag in a location of said check queue area corresponding to the index unit area which is not recovered for indicating that a recovery of the information is suspended.

4. A recording apparatus according to claim 3, wherein when said recovering means does not check whether or not a data unit area corresponding to the index unit area which is determined to include an error is normal, said recovering means records the state flag in a location of said check queue area corresponding to the index unit area determined to include an error for indicating that the information has not been checked.

5. A recording apparatus according to claim 2, wherein said recovering means further checks a plurality of continuous index unit areas in sequence, wherein when discontinuity is detected in serial numbers given to the plurality of index unit areas between adjacent index unit areas except for the latest index unit area and the oldest index unit area, said recovering means determines that an error exists in index unit information in the index unit areas including the discontinuous number.

6. A recording apparatus according to claim 5, wherein said recovering means further checks a plurality of continuous index unit areas in sequence, detects the latest index unit area and the oldest index unit area, determines that an error exists in index unit areas which include the discontinuous numbers when the discontinuous numbers are detected in the index unit areas between the latest and oldest index unit areas, and writes dummy index information into the index unit areas which are determined to include the error such that the numbers of said plurality of index unit areas are continuous.

7. A recording method for a circulating recording apparatus for executing process with the aid of a computer including a the oldest recorded data in a recording area having a limited storage capacity with the latest recorded data, said method comprising the steps of:

recording data in a data recording area provided in a memory device for recording the data;

recording index information related to the data recorded in said data recording area in an index information area provided in said memory device;

recording index information substantially the same as the index information in a reserve index information area provided in part of said data recording area;

determining whether or not an error exists in the index information recorded in said index information area; and recovering the index information in said index information area based on the index information in said reserve index information area when the error exists, wherein said data recording area includes a plurality of data unit areas, wherein the recorded data is divided and recorded in each unit area, said index information area includes a plurality of index unit areas, wherein said index information is divided and recorded in each said index unit area corresponding to the data unit area, said recovering means checks the index information from one index unit area to another for an error, and recovers index information from the error in an index unit area which is determined to include the error, said data recording area records data of a plurality of video frames, and each of the plurality of video frames is given a serial number, said index information unit area records index information which includes frame information indicative of a first frame number and the number of video frames recorded in a data unit area corresponding to said index unit area, and a state flag for identifying whether data in said data unit area is in a normal state, or in an unused state, or in a damaged state, said recording apparatus further comprises a check queue area for recording whether each of data in said plurality of data unit areas recorded in said data recording area is in a recovered state, or in a suspended state, or in an unchecked state, and said recovering means checks said plurality of data unit areas and index unit areas for an error based on the information recorded in said state flag and the information recorded in said check queue area.

* * * * *